March 18, 1958 E. LAXO 2,826,888
POWER MOWER WITH COACTING ENDLESS AND STATIONARY CUTTERS
Filed May 4, 1956 5 Sheets-Sheet 1
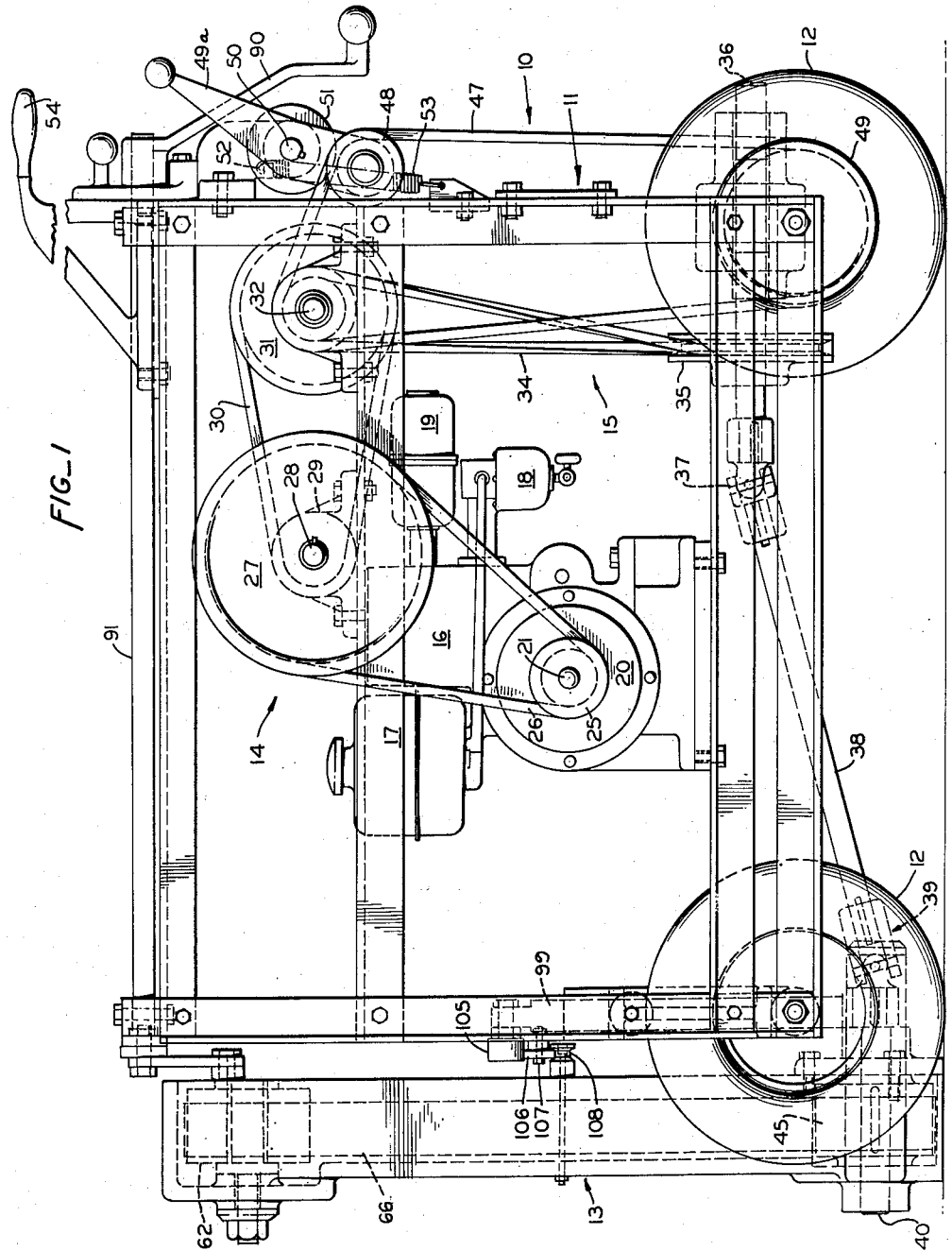
INVENTOR.
ED LAXO
BY Edward B. Fogg
ATTORNEY

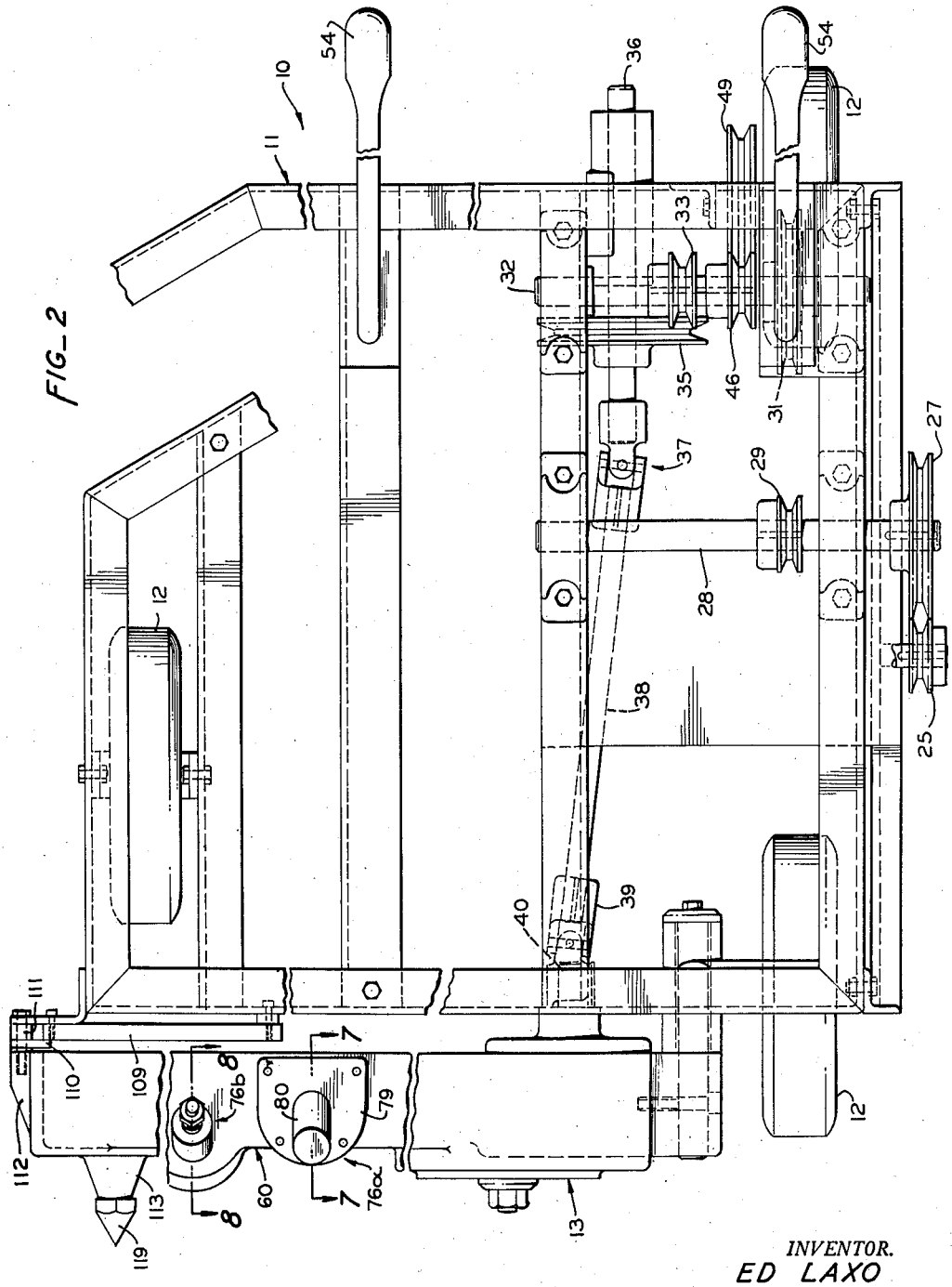

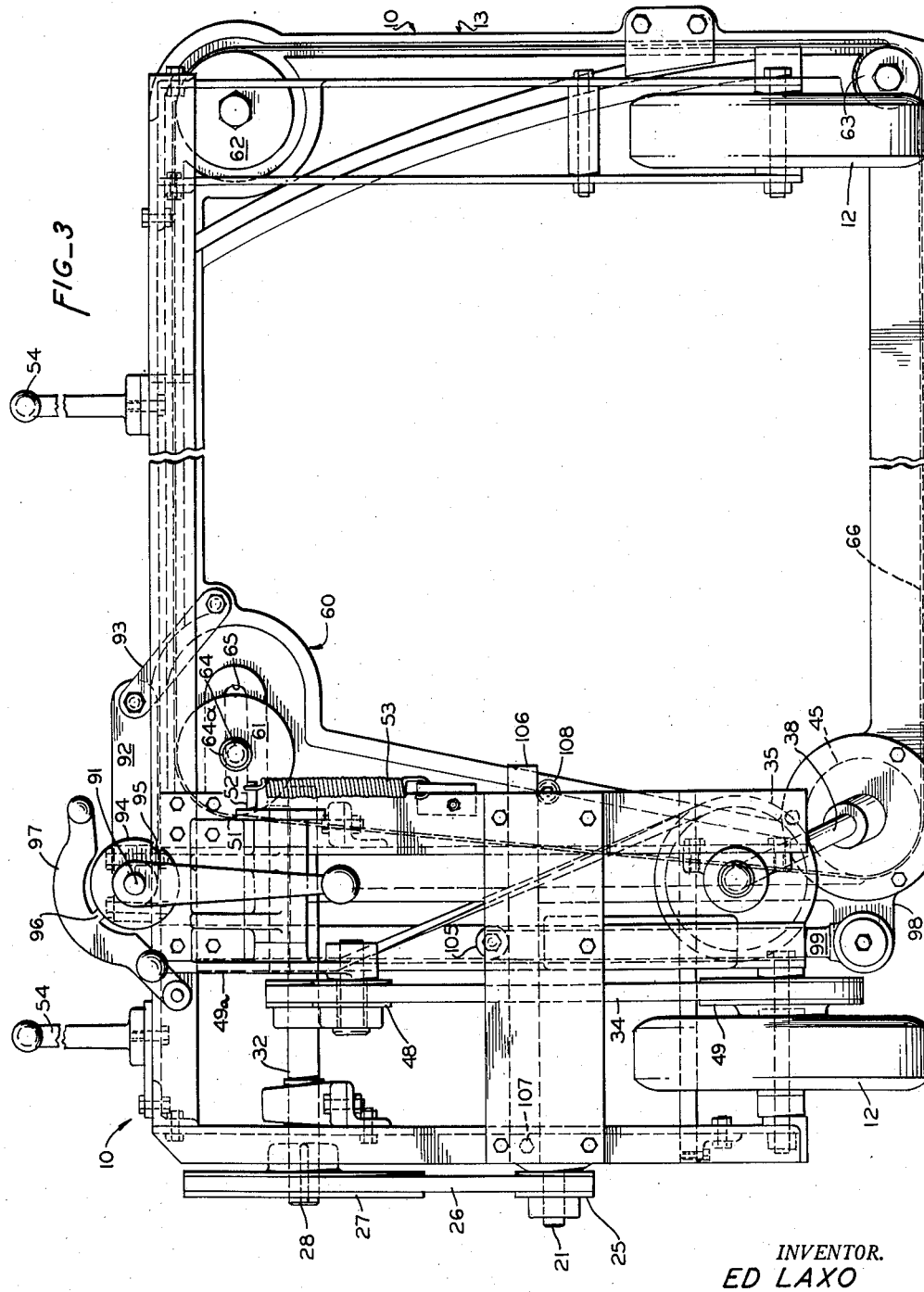

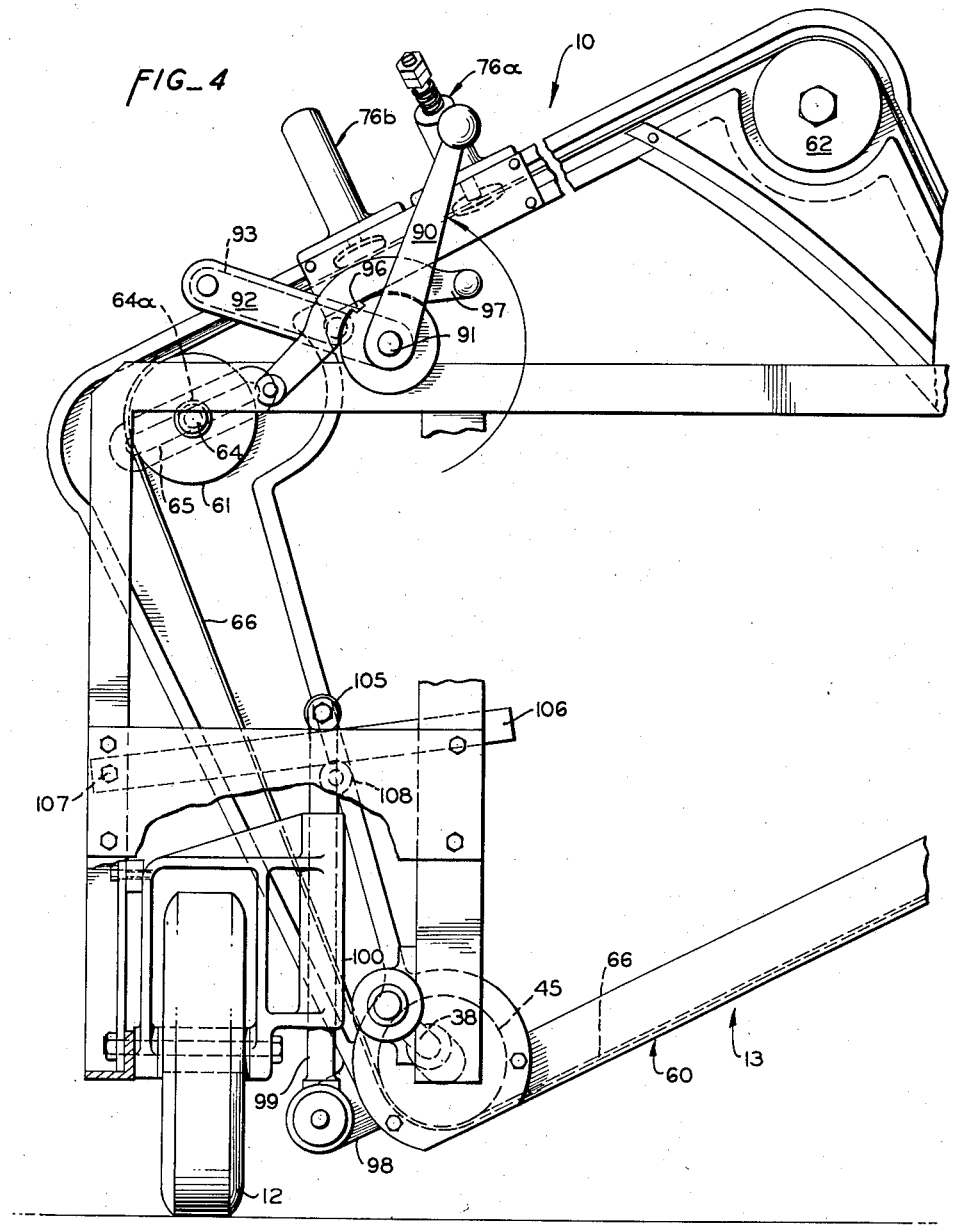
FIG_4

March 18, 1958 E. LAXO 2,826,888
POWER MOWER WITH COACTING ENDLESS AND STATIONARY CUTTERS
Filed May 4, 1956 5 Sheets-Sheet 5
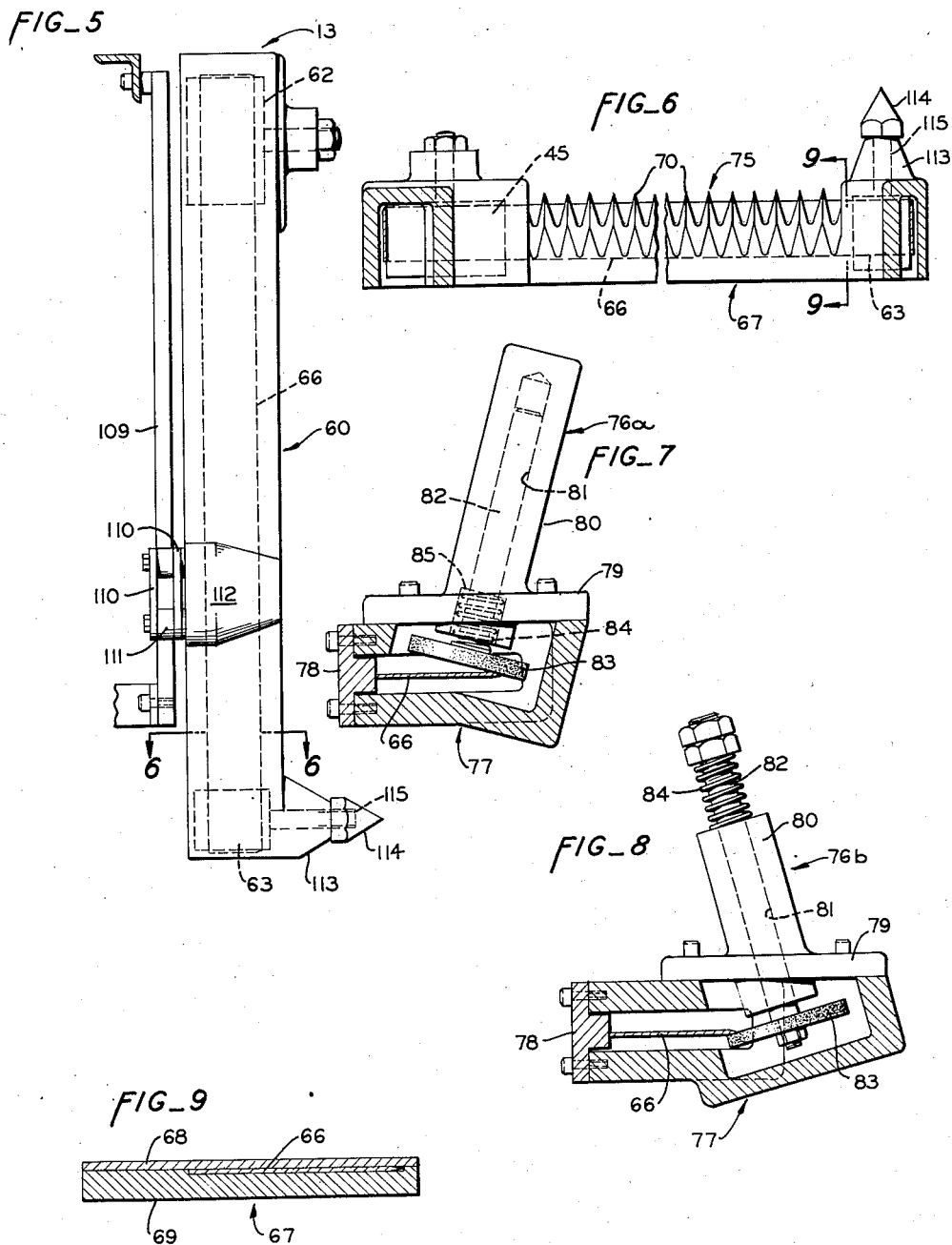
INVENTOR.
ED LAXO
BY
ATTORNEY United States Patent Office 2,826,888
Patented Mar. 18, 1958

2,826,888

POWER MOWER WITH COACTING ENDLESS AND STATIONARY CUTTERS

Ed Laxo, Oakland, Calif.

Application May 4, 1956, Serial No. 582,795

4 Claims. (Cl. 56—25)

This invention relates to a mowing machine for mowing grass, alfalfa and the like. More particularly it relates to a mowing machine for agricultural use.

Mowing machines used heretofore, other than small machines for mowing lawns, employ a reciprocating cutting member such as a set of movable blades which move back and forth in relation to a set of stationary blades, thus providing a scissors type of action.

Reciprocating motion of this character is disadvantageous, among other reasons because of the power required. Rapid reversal of the movable cutting member at the end of each stroke results in shock and vibration and is wasteful of power.

It is an object of the present invention to provide a mowing machine suitable for agricultural use which obviates the disadvantages of prior reciprocating machines.

It is a further object of the invention to provide a mowing machine for agricultural purposes in which the moving cutting element moves continuously and in one direction.

Yet another object of the invention is to provide a mowing machine for agricultural purposes in which the moving cutting element is a continuously moving, flexible band.

These and other objects of the invention will be apparent from the ensuing description and the appended claims.

One form of the invention is illustrated by way of example in the accompanying drawings, in which—

Figure 1 is a fragmentary view of the machine in side elevation.

Figure 2 is a top plan view of the machine partly broken away and with certain parts omitted.

Figure 3 is a fragmentary rear view of the machine as seen from the right of Figure 1.

Figure 4 is a view similar to that of Figure 3 but showing the pivot frame tilted. Certain parts are omitted to reveal more clearly the mechanism by which the pivot frame is tilted and lifted.

Figure 5 is a view in side elevation of the pivot frame of the machine as seen from the right of Figure 3.

Figure 6 is a fragmentary view taken along the line 6—6 of Figure 5, showing the comb or stationary cutting element and the cutting band or moving cutting element in detail.

Figures 7 and 8 are views along the lines 7—7 and 8—8, respectively, of Figure 2 showing the two honing elements employed to hone the cutting band.

Figure 9 is a view taken along the line 9—9 of Figure 6.

Referring now to the drawings and more particularly to Figures 1, 2 and 3, the machine is generally designated by the reference numeral 10. It comprises a main frame 11 having a pair of handles 54 and supported by wheels 12, there being three such wheels as shown in Figure 2 although a different number of wheels may be employed. A mowing assembly 13 is pivotally supported on the front of the main frame, i. e., to the left as viewed in Figure 1.

Motive means is provided at 14 which is connected by a transmission generally designated as 15 to one of the wheels 12 and to one of the pulleys (indicated as 45 in Figure 1) which support and drive the cutting band or blade.

The motive means 14 comprises a gasoline motor 16 with the usual auxiliary apparatus including a fuel tank 17, a carburetor 18, a muffler 19 and a crankcase 20. The main drive shaft 21 of the motive means is fixed to a pulley 25 which is connected by a belt 26 to a pulley 27 which is fixed to a countershaft 28 journaled in the frame of the machine. Referring to Figures 1 and 2, a pulley 29 is fixed to the countershaft 28 and is connected by a belt 30 to a pulley 31 which is fixed to a second countershaft 32. A pulley 33 is fixed to the second countershaft 32 and is connected by a belt 34 to a pulley 35 which is fixed to a shaft 36. The shaft 36 is journaled in the frame of the machine and it forms part of a flexible shaft connection. Thus, the shaft 36 is connected by a flexible coupling 37 to a shaft 38 which in turn is connected by a flexible coupling 39 to a shaft 40. The shaft 40 is journaled in the frame of the machine and it is fixed to the aforementioned pulley 45. It will, therefore, be apparent that the motive means 14 is operatively connected to the pulley 45 and drives the same at all times. The transmission described and illustrated serves as a gear reduction means to drive the mowing element at proper speed. If desired, this transmission may be disengaged from the pulley 45 by removing the belt 34 from one or the other of the pulleys 33 and 35.

Referring to Figures 1, 2 and 3, a pulley 46 is fixed to the countershaft 32. A belt 47 extends about the pulley 46 and also about an idler pulley 48 and about a pulley 49. The pulley 49 is fixed to the axle of one of the wheels 12, i. e., to the axle of the left rear wheel as viewed in Figure 3. The pulley 48 is journaled in one end of a lever 49a which is fixed to one end of a shaft 50 journaled in the frame of the machine. To the other end of the shaft 50 is fixed a disc 51 from which projects a pin 52 (see Figure 3). A spring 53 is attached at one end to the pin 52 and at its other end to the frame of the machine. From an inspection of Figure 1 it will be apparent that the pin 52 has an overcenter relation to the fixed end of the spring 53 and to the shaft 50. Therefore the spring 53 will hold the pulley 48 in either the position shown in Figure 1 (wherein it places tension on the belt 47 and brings about a driving connection between the pulleys 46 and 49) or in another position (not shown) wherein the belt 47 is caused to slacken, thereby disengaging the driving pulley 46 from such driving connection.

It will, therefore, be apparent that a clutch is provided which is operated by the lever 49 and by means of which the motive means 14 can be engaged with and disengaged from the wheels 12 at will.

Referring now to Figures 1, 2 and 3 and to Figures 5 to 9, inclusive, the mowing element 13 comprises a box frame 60 which is supported by the main frame 11 and is manipulated in the manner described hereinafter. Journaled in the box frame 60 are the aforementioned pulley 45 and also pulleys 61, 62 and 63. As will be seen, the pulley 63 is of lesser diameter than the pulleys 45, 61 and 62, the reason for which is explained hereinafter. As shown in Figures 3 and 4 the pulley 61 is carried by a shaft 64 which is slideable in a slot 65 formed in the box frame 60. A nut 64a is provided to clamp the shaft in selected position within the slot 65. By this means the cutting band 66 may be tightened or slackened as desired.

As best shown in Figures 6 and 9, the lower course of the cutting band 66 is carried in a housing which is generally designated by the reference numeral 67 and which comprises top and bottom portions 68 and 69, respectively. The top portion 68 is formed with teeth 70 which form a comb 75 which overlies the cutting band 66 and provides a stationary cutting element.

As best shown in Figures 7 and 8, two honing elements 76a and 76b are provided, one of which is intended to sharpen the cutting edge of the band 66 from above, the other being intended to sharpen the same from below. Since the two elements are substantially identical except for their different placement description will be with reference to Figure 7. Similar parts in Figure 8 are similarly numbered. Referring, therefore, to Figure 7, the cutting band 66 passes through a housing 77 which includes a back stop 78 to resist the rearward thrust of the honing member. The housing also includes a cover plate 79 which is integral with a boss 80 which is cored out at 81 to receive the spindle 82 of a grinding wheel or honing element 83. A spring 84 is provided which is compressed between the grinding wheel 83 and a shoulder 85. By this means it will be apparent that, as the cutting band 66 passes beneath the grinding wheel 83, the latter will be caused to rotate by frictional engagement. The wheel 83 will, therefore, sharpen the cutting edge of the band. In like manner the grinding wheel 83 shown in Figure 8 will sharpen the cutting edge of the band 66 from below.

Referring now more particularly to Figures 1, 3 and 4, a crank 90 is provided at the rear of the machine which is clamped to and is intended to operate a shaft 91 which is journaled in and extends lengthwise of the frame of the machine. At its forward end the shaft 91 is fixed to a lever 92 which is connected by a link 93 to the box frame 60, as best shown in Figure 3. A disc 94 is also fixed to the shaft 91 and has a notch 95 intended to receive a tongue 96 projecting from a latch lever 97 which is pivoted on the main frame 11 of the machine. The lever 97 is so weighted that it normally is in the down position illustrated in Figure 3 with the tongue 96 resting upon the disc 94. When the crank 90 is rotated from the position shown in Figure 3 to that shown in Figure 4, the tongue 96 drops by gravity into the notch 95 and serves to clamp the shaft 91 in the position shown in Figure 4. It will be apparent that this action will rotate the box frame 60 in counterclockwise direction as viewed in Figures 3 and 4. Provision is also made for lifting the lower left-hand corner of the box frame from the lower operating position shown in Figure 3 to the elevated nonoperating position shown in Figure 4. For this purpose a bracket 98 projects from the box frame 60 on which is rotatably mounted the lower end of a rod 99 which is slideable in a sleeve 100. The sleeve 100 is fixed to the main frame of the machine. A cam follower roller 105 is rotatably mounted on the upper end of the rod 99 and rides on the upper surface of a cam 106 which is pivoted to the frame of the machine at 107. A cam roller 108 is mounted on the box frame 60 and rolls on the undersurface of the cam 106.

It will be apparent that, when the crank 90 is rotated from the position shown in Figure 3 to that shown in Figure 4, not only will it rotate the box frame 60 in counterclockwise direction as viewed in Figures 3 and 4 but, by reason of the action of the cam roller 108, the cam 106 will be lifted. The latter, acting through the cam roller 105 and rod 109, will lift the lower left-hand corner of the frame 60 so as to provide adequate ground clearance while the machine is moved from one place to another. When it is desired to restore the frame 60 to its lower, operating position all that is required is to lift the latch lever 97, disengage the tongue 96 from the notch 95 and rotate the crank 90 back to the position shown in Figure 3, thereby rotating and lowering the box frame 60 to the position shown in Figure 3.

Referring now to Figure 5, for the purpose of guiding the box frame 60 during the rotating and lifting (or lowering) movements described, and also for imparting a measure of stability, a guide bar 109 is provided which is fixed to the main frame 11 of the machine. Two slide bars or plates 110 are provided which are spaced apart by spacer elements 111 and which are bolted to a tapered boss 112 projecting laterally from the box frame 60. The purpose of the taper of the boss 112 is to facilitate its passage through grass and to part the grass evenly. To further assist passage of the machine through grass and parting of grass as it is mowed, a tapered boss or projection 113 is formed at the bottom and lowermost corner of the box frame 60 and a tapered nut 114 is provided which is threaded to the threaded outer end 115 of the shaft of the pulley 63. The small diameter of the pulley 63 also contributes to even parting of the grass.

It will, therefore, be apparent that a mowing machine has been provided which fulfills the objects stated above. It is relatively simple in its design, construction and operation. It employs a continuously moving band which, in cooperation with a stationary cutting element (the comb 75) performs the cutting or mowing function. It therefore avoids the disadvantages of a reciprocating mechanism. It is capable of being propelled and operated by a relatively small horsepower motor and the mowing mechanism can be easily shifted from an operating position for mowing purposes to a nonoperating position for purposes of transport from one place to another, as between jobs.

I claim:

1. A mowing machine of the character described comprising a main frame having a forward end, traction wheels supporting said main frame for rolling movement along the ground, a pivot frame pivotally supported on said main frame at the forward end thereof for pivoting in a substantially vertical plane between a lower operating position and a higher nonoperating position, said pivot frame having rotary members for rotatably supporting a continuous cutting band moving in a closed path with a portion of said path located horizontally and at the bottom of the pivot frame when the latter is in operating position, a fixed cutting element carried by said pivot frame adjacent the bottom portion thereof, means operatively associated with said main and pivot frames for pivoting said pivot frame and for supporting it in both its lower operating position and its higher nonoperating position, a continuous cutting band supported by said rotary members to move in said closed path and means operatively associated with said main frame and said band for so moving said band as the machine is wheeled along the ground.

2. A mowing machine of the character described comprising a main frame having a forward end, traction wheels supporting said main frame for rolling movement along the ground, a pivot frame pivotally supported on said main frame at the forward end thereof for lifting and pivoting in a substantially vertical plane between a lower operating position and a higher nonoperating position, said pivot frame having rotary members for rotatably supporting a continuous cutting band moving in a closed path with a portion of said path located horizontally and at the bottom of the pivot frame when the latter is in operating position, a fixed cutting element in the form of a plurality of teeth carried by said pivot frame adjacent the bottom portion thereof, means operatively associated with said main and pivot frames for pivoting and lifting said pivot frame and for supporting it in both its lower operating position and its higher nonoperating position, a continuous cutting band supported by said rotary members to move in said closed path and means operatively associated with said main frame and said band for so moving said band as the machine is wheeled along the ground.

3. A mowing machine of the character described comprising a main frame, a traction wheel support on said main frame for rolling movement along the ground, a motor supported by said main frame, a transmission operatively connecting said motor with said wheel support to move the machine along the ground, a pivot frame, a fixed cutting element carried by said pivot frame and a moving cutting element mounted on said pivot frame for continuous unidirectional movement in a closed path, a portion of said path being adjacent said fixed cutting element, means supporting said pivot frame on said main frame for shifting between a first operating position wherein said fixed cutting element is adjacent and parallel to the ground and a second rotated position in which the pivot frame is rotated and said fixed cutting element is elevated from the ground; said machine also having means thereon for shifting said pivot frame from either of said positions to the other; said machine also having transmission means connecting said motor with said moving cutting element.

4. A mowing machine of the character described comprising a main frame, a traction wheel support on said main frame for rolling movement along the ground, a motor supported by said main frame, a transmission operatively connecting said motor with said wheel support to move the machine along the ground, a pivot frame, a fixed cutting element in the form of a plurality of teeth carried by said pivot frame and a moving cutting element mounted on said pivot frame for continuous unidirectional movement in a closed path, a portion of said path being adjacent said fixed cutting element, means supporting said pivot frame on said main frame for shifting between a first operating position wherein said fixed cutting element is adjacent and parallel to the ground and a second rotated position in which said pivot frame is rotated and said fixed cutting element is elevated from the ground; said machine also having means thereon for shifting said pivot frame fro meither of said positions to the other; said machine also having transmission means connecting said motor with said moving cutting element.

References Cited in the file of this patent

UNITED STATES PATENTS

| 14,445 | Comfort | Mar. 18, 1856 |
| 477,189 | Marble | June 14, 1892 |
| 666,298 | Wisherd | Jan. 22, 1901 |
| 1,165,342 | Peterson | Dec. 21, 1915 |
| 1,175,761 | Hodam | Mar. 14, 1916 |
| 1,269,522 | Breneman | June 11, 1918 |
| 1,754,157 | Gallison | Apr. 8, 1930 |
| 1,963,449 | Rubin | June 19, 1934 |
| 2,079,945 | Manning | May 11, 1937 |
| 2,468,276 | Sorenson | Apr. 26, 1949 |

FOREIGN PATENTS

| 3,943 | Great Britain | Feb. 26, 1884 |